United States Patent [19]

Dias et al.

[11] Patent Number: 4,950,721

[45] Date of Patent: Aug. 21, 1990

[54] ION-EXCHANGE REACTIONS FOR POLYMERIC ALKALI METAL CARBOXYLATES

[75] Inventors: Anthony J. Dias, Linden; Joseph A. Olkusz, Fanwood, both of N.J.

[73] Assignee: Exxon Chemical Patents Inc., Linden, N.J.

[21] Appl. No.: 416,412

[22] Filed: Oct. 3, 1989

[51] Int. Cl.$^5$ ............................................... C08F 8/40
[52] U.S. Cl. ................................. 525/340; 525/332.8; 525/332.9; 525/333.1; 525/333.2; 525/333.3; 525/333.6; 525/359.1; 525/366; 525/370; 525/379
[58] Field of Search ................... 525/340, 359.1, 366, 525/370, 379

[56] References Cited

U.S. PATENT DOCUMENTS 3,786,116  1/1974  Milkovich et al. ................ 260/885
3,842,146  10/1974  Milkovich et al. ................ 260/879

OTHER PUBLICATIONS

Macromolecular Reviews, vol. 2, pp. 74-83, Interscience Publishers, Inc. (1967).
D. P. Wyman et al., Journal of Polymer Science, Part A, vol. 2, pp. 4545-4550 (1964).
P. Mansson, Journal of Polymer Science, Polymer Chemistry Edition, vol. 18, pp. 1945-1956 (1980).
R. N. Young et al., Advances in Polymer Science, No. 56, pp. 70-72.
R. P. Quirk et al., Makromolecular Chemistry, 183, 2071-2076 (1982).
R. P. Quirk et al., Polymer Preprints 29, 401-402 (1987).
J. March, Advanced Organic Chemistry 3rd Edition, p. 353, Wiley, N.Y. 1985.

*Primary Examiner*—Bernard Lipman
*Attorney, Agent, or Firm*—W. G. Muller

[57] ABSTRACT

A method for preparing functionalized polymers formed by anionic polymerization, e.g., polystyrene, polyisoprene, etc., generally comprising the steps of conducting anionic polymerization, contacting the polymer so formed with $CO_2$ in the presence of a polar diluent, then conducting an ion-exchange reaction between the carbonated polymer product and a hydrocarbon soluble salt.

12 Claims, No Drawings

ION-EXCHANGE REACTIONS FOR POLYMERIC ALKALI METAL CARBOXYLATES

BACKGROUND OF THE INVENTION

1. Technical Field

The present invention relates to polymers prepared by anionic polymerization, such as those of styrene, isoprene and butadiene, that are activated for nucleophilic reactions in hydrocarbon media by conducting an ion exchange reaction between alkali metal polymeric carboxylates and salts of specific Lewis acids and bases such as tetrabutylammonium fluoride.

2. Background Information

Alkali metal compound initiated, anionic polymerization is a well-known synthetic method of preparing polymers, of such monomers as styrene, isoprene and butadiene, by which the major variables affecting polymer properties can be controlled. Under the preferred operating conditions generally known in the art, spontaneous termination or chain-transfer reactions of the forming polymer can be essentially avoided. This characteristic has led to standard use of the terms "living polymerization" or "living polymers" for such polymerization reactions and the corresponding polymers. Living polymerization allows the preparation of polymers of pre-determined molecular weight, narrow molecular weight distribution ("MWD"), and chain-end functionality. A vast array of synthetic procedures and novel polymers have resulted from the use of these well-characterized, functionalized polymers in grafting, co-polymerization, and linking reactions. Specifically, the carbonation of living polymeric anions using carbon dioxide is both known and in wide use.

In "Reaction of Polystyryllithium with Carbon Dioxide", Wyman et al, Journal of Polymer Science; Part A, Vol. 2, pages 4545–4550 (1964), reported that polystyryllithium terminated with gaseous carbon dioxide yielded the polystyrenecarboxylic acid but also di-polystyryl ketone and branched tri-polystyryl carbinol in a 60/28/12 % yield, respectively. Mansson in "Reactive of Polystyryl Anions with Carbon Dioxide and Oxygen", Journal of Polymer Science, Polymer Chemistry Edition, Vol. 18, pages 1945–1956 (1980) reported yields of polystyrenecarboxylic acid lower than that reported by Wyman, et al, when the reaction of gaseous carbon dioxide and polystyryllithium at about 10° C. was conducted in a solvent of mixed methylcyclohexane and tetrahydrofuran (THF), as compared to the benzene solvent of Wyman.

Young, et al., in "Advances in Polymer Science" #56, pages 70–72, noted that use of Lewis bases such as tetrahydrofuran ("THF") served to promote disaggregation of polymeric organolithium species and thus in the presence of an excess of THF, in a 75/25 mixture by volume of benzene and THF, carbonation of poly(styryl) lithium, poly(isoprenyl)lithium, and poly(styrene-b-isoprenyl)lithium, reportedly resulted in quantitative suppression of coupling side reactions. Similar results are reported by Quirk, et al., in "Functionalization of Polymeric Organolithium Compound Carbonation", Makromolecular Chemistry, 183, 2071–2076 (1982). One hundred percent yields were reported for 75/25 benzene/THF carbonation solvents. Remarks as to the expressed need for contaminate-free conditions were later discounted in Quirk and Yin, "Functionalization Reactions of Poly(styryl)lithium with Carbon Dioxide", Polymer Preprints 29, 401–402 (1987). Carboxylation yields for the earlier report are here characterized as having been "essentially quantitative." Both reports teach polymerization at 30° C. under high vacuum conditions with gaseous $CO_2$ introduced after addition of THF into the polymerization reaction vessel. The essentially quantitative yields were said to be obtained from freeze-dried solutions of poly(styryl)lithium.

The polymeric alkali metal carboxylates formed using the above techniques have limited utility for nucleophilic reactions in hydrocarbon media: the bond formed between the carboxylate anion and the preferred alkali metal cation is strong and preferred over those formed in nucleophilic reactions on carbon electrophiles. Thus it is necessary to transform the alkali metal carboxylate into another salt in order to increase the utility of these polymers. It is well known in the art (J. March, Advanced Organic Chemistry 3rd Edition, page 353, Wiley, N.Y. 1985) that replacement of lithium with sodium, potassium, or cesium increases the nucleophilicity of the carboxylate in polar non-protic solvents such as hexamethylphosphorictriamide (HMPA). Potassium carboxylates are good nucleophiles in hydrocarbon media if a complexing agent is added like 18-Crown-6. Most organic cations, which include alkyl and aryl substituted ammonium and phosphonium cations, are soluble in hydrocarbon liquids and hence polymeric ammonium carboxylates are good nucleophiles in hydrocarbon media. Thus typically prior to the disclosure of this invention, polymeric alkali metal carboxylates have been converted to the polymeric carboxylic acid form by treatment with a strong acid and then neutralized with a base having the desired cation.

However, the polymeric alkali metal carboxylates have limited stability; they are capable of undergoing decarboxylation reactions. The decarboxylation reaction occurs to a limited extent during isolation of the dry alkali metal carboxylate polymer; however, it has recently been unexpectedly observed that polymeric decarboxylation reactions are greatly accelerated upon formation of the carboxylic acid for subsequent reneutralization with a desired base. It is believed that this labile decarboxylation is the result of the placement of an activated hydrogen substituent on the carbon adjacent to both the carboxylic acid and a resonance stabilizing group, such as aryl or vinyl unsaturation, constituted by the remaining polymer. It has been surprisingly discovered that these decarboxylation reactions can be essentially eliminated, thus substantially increasing the resulting polymeric carboxylate salts available for subsequent reaction, by conducting an ion-exchange reaction without forming the polymeric carboxylic acid and subsequently neutralizing. It is believed that by eliminating the formation of the carboxylic acid, the hydrogen substituent on the polymer segment adjacent to the carbonyl grouping is not activated and thus decarboxylation is substantially depressed.

In view of the many uses for living polymers, particularly those comprised of styrene, isoprene and butadiene, having reactive end-groups capable of subsequent coupling, crosslinking, etc., the need for efficient, cost-effective means of preparation of such polymers is evident. It is thus an object of this invention to provide an improved method of functionalizing polymers produced by living polymerization whereby improved utilization of reactants is achieved while simultaneously minimizing the occurrence of undesirable side reactions and by-products.

SUMMARY OF THE INVENTION

The present invention is a method for preparing functionalized polymers of monomers capable of anionic polymerization generally comprising contacting a polymeric alkali metal carboxylate, formed by anionic polymerization and subsequent reaction with gaseous $CO_2$ in the presence of a polar diluent, with a hydrocarbon soluble salt capable of abstracting the alkali metal from said polymeric alkali metal carboxylate and substituting therefor the cation of said hydrocarbon soluble salt essentially without formation of a polymeric carboxylic acid. By avoiding the formation of the carboxylic acid form of the carbonated living polymer, decarboxylation reactions from subsequent re-neutralization are substantially reduced and higher quantities of activated, functionalized derivatives of the living polymers are produced. The functionalized derivatives so formed are useful for subsequent nucleophilic reactions, including those effective to render graft polymer products having at least one polymeric segment, the living polymer derivative.

DETAILED DESCRIPTION OF THE INVENTION

The functionalized polymers of this invention can be comprised of the monomers capable of anionic polymerization initiated by organo-metallic compounds in known living polymerization reactions. The living polymers are conveniently prepared by contacting the monomers or combination of monomers with an anionic polymerization initiator in the presence of an inert organic diluent which does not participate in or interfere with a polymerization reaction.

Those monomers susceptible to anionic polymerization are well-known and the present invention contemplates the use of all anionically polymerizable monomers. Preferred anionically polymerizable monomers include vinyl substituted aromatic hydrocarbons containing up to about 12 carbon atoms and conjugated dienes containing 4 to 12 carbon atoms per molecule. Examples of these monomers include styrene, alphamethylstyrene, vinyl toluene and its isomers, isoprene, butadiene and mixtures thereof.

Many other monomers suitable for anionic polymerization are those disclosed in Macromolecular Reviews, Vol. 2, pp. 74–83, Interscience Publishers, Inc. (1967), entitled "Monomers Polymerized by Anionic Initiators" and U.S. Pat. No. 3,786,116, the disclosures of which is incorporated herein by reference.

Non-limiting illustrative species include vinyl aromatic compounds, such as styrene, alpha-methylstyrene, vinyl toluene and its isomers; vinyl unsaturated amides such as acrylamide, methacrylamide, N,N-dilower alkyl acrylamides, e.g., N-N-dimethylacrylamide; acenaphthalene; 9-acrylcarbazole; acrylonitrile and methacrylonitrile; organic isocyanates including lower alkyl, phenyl, lower alkyl phenyl and halophenyl isocyanates, organic diisocyanates including lower alkylene, phenylene and tolylene diisocyanates; lower alkyl and allyl acrylates and methacrylates, including methyl, t-butyl acrylates and methacrylates; lower olefins, such as ethylene, propylene, butylene, isobutylene, pentene, hexane, etc.; vinyl esters of aliphatic carboxylic acids such as vinyl acetate, vinyl propionate, vinyl octoate, vinyl oleate, vinyl stearate, vinyl benzoate; vinyl lower alkyl ethers; vinyl pyridines, vinyl pyrrolidones; dienes including isoprene and butadiene. The term "lower" as used above to denote organic groups containing eight or fewer carbon atoms. The preferred olefinic containing monomers are conjugated dienes containing 4 to 12 carbon atoms per molecule and the vinyl-substituted aromatic hydrocarbons containing up to about 12 carbon atoms.

The initiators for these anionic polymerizations are alkali metal compounds consisting of any alkali metal hydrocarbons and alkoxide salts which produce a mono-functional living polymer, i.e., only one end of the polymer contains a reactive anion. Those catalysts found suitable include the hydrocarbon of lithium sodium or potassium as represented by the formula RMe wherein Me is an alkali metal such as sodium, lithium or potassium and R represents a hydrocarbon radical, for example, an alkyl radical containing up to about 20 carbon atoms or more, and preferably up to about eight carbon atoms, an aryl radical, an alkaryl radical or an aralkyl radical. Illustrative alkali metal hydrocarbons include ethyl sodium, n-propyl sodium, n-butyl potassium, n-octyl potassium, phenyl sodium, ethyl lithium, sec-butyl lithium, t-butyl lithium and 2-ethylhexyl lithium. Sec-butyl lithium is the preferred initiator because it has a fast initiation which is important in preparing polymers of narrow molecular weight distribution. It is preferred to employ the alkali metal salts of tertiary alcohols, such as potassium t-butyl alkoxylate, when polymerizing monomers having a nitrile or carbonyl functional group.

The alkali metal hydrocarbons and alkoxylates are either available commercially or may be prepared by known methods, such as by the reaction of a halohydrocarbon, halobenzene or alcohol and the appropriate alkali metal.

An inert solvent generally is used to facilitate heat transfer and adequate mixing of initiator and monomer. Hydrocarbons and ethers are the preferred solvents. Solvents useful in the anionic polymerization process include the aromatic hydrocarbons such as benzene, toluene, xylene, ethylbenzene, t-butylbenzene, etc. Also suitable are the saturated aliphatic and cycloaliphatic hydrocarbons such as n-hexane, n-heptane, n-octane, cyclohexane and the like. In addition, aliphatic and cyclic ether solvents can be used, for example, dimethyl ether, diethyl ether, dibutyl ether, tetrahydrofuran, dioxane, anisole, tetrahydropyran, diglyme, glyme, etc. The rates of polymerization are faster in the ether solvents than in the hydrocarbon solvents, and small amounts of ether in the hydrocarbon solvent increase the rates of polymerization.

The amount of initiator is an important factor in anionic polymerization because it determines the molecular weight of the living polymer. If a small proportion of initiator is used, with respect to the amount of monomer, the molecular weight of the living polymer will be larger than if a large proportion of initiator is used. Generally, it is advisable to add initiator dropwise to the monomer (when that is the selected order of addition) until the persistence of the characteristic color of the organic anion is achieved, then add the calculated amount of initiator for the molecular weight desired. The pre liminary dropwise addition serves to destroy contaminants and thus permits better control of the polymerization.

To prepare a polymer of narrow molecular weight distribution, it is generally preferred to introduce all of the reactive species into the system at the same time. By this technique, polymer growth by consecutive addition of monomer takes place at the same rate to an active terminal group, without chain transfer or termination reaction. When this is accomplished, the molecular weight of the polymer is controlled by the ratio of monomer to initiator, as seen from the following representation:

Molecular weight of living polymer =

$$\frac{\text{Moles of monomer}}{\text{Moles of initiator}} \times \text{Molecular weight of monomer}$$

As it can be seen from the above formula, high concentrations of initiator leads to the formation of low molecular weight polymers, whereas, low concentrations of initiator leads to the production of high molecular weight polymers.

The concentration of the monomer charged to the reaction vessel can vary widely, and is limited by the ability of the reaction equipment to dissipate the heat of polymerization and to properly mix the resulting viscous solutions of the living polymer. Concentrations of monomer as high as 50% by weight or higher based on the weight of the reaction mixture can be used. However, the preferred monomer concentration is from about 5% to about 25% in order to achieve adequate mixing.

As can be seen from the formula above and the foregoing limitations on the concentration of the monomer, the initiator concentration is critical, but may be varied according to the desired molecular weight of the living polymer and the relative concentration of the monomer. Generally, the initiator concentration can range from about 0.001 to about 0.1 mole of active alkali metal per mole of monomer, or higher. Preferably, the concentration of the initiator will be from about 0.01 to about 0.004 mole of active alkali metal per mole of monomer.

The temperature of the polymerization will depend on the monomer. Generally, the reaction can be carried out at temperatures ranging from about $-100°$ C. up to about $100°$ C. When using aliphatic and hydrocarbon diluents, the preferred temperature range is from about $-10°$ C., to about $100°$ C. With ethers as the solvent, the preferred temperature range is from about $-100°$ C. to about $100°$ C. The polymerization of the styrene is generally carried out at slightly above room temperature: the polymerization of alpha-methylstyrene preferably is carried out at lower temperatures, e.g., $-80°$ C.

The preparation of the living polymer can be carried out by adding a solution of the alkali metal hydrocarbon initiator in an inert organic solvent to a mixture of monomer and diluent at the desired polymerization temperature and allowing the mixture to stand with or without agitation until the polymerization is completed. An alternative procedure is to add monomer to a solution of the catalyst in the diluent at the desired polymerization temperature at the same rate that it is being polymerized. By either method the monomer is converted quantitatively to a living polymer as long as the system remains free of impurities which inactivate the anionic species. As pointed out above, however, it is important to add all of the reactive ingredients together rapidly to insure the formation of a uniform molecular weight distribution of the polymer.

The anionic polymerization must be carried out under carefully controlled conditions, so as to exclude substances which destroy the catalytic effect of the catalyst or initiator. For example, such impurities as water, oxygen, carbon monoxide, carbon dioxide, and the like. Thus, the polymerization are generally carried out in dry equipment, using anhydrous reactants, and under an inert gas atmosphere, such as nitrogen, helium, argon, methane, and the like.

The above-described living polymers are susceptible to further reactions including further polymerization. Thus, if additional monomer, such as styrene, is added to the living polymer, the polymerization is renewed and the chain grows until no more monomeric styrene remains. Alternatively, if an another different anionically polymerizable monomer is added, such as butadiene or ethylene oxide, the above-described living polymer initiates the polymerization of the butadiene or ethylene oxide and the ultimate living polymer which results consists of a polystyrene segment and a polybutadiene or polyoxyethylene segment.

A poly(styrene-ethylene) block copolymer can be prepared by contacting living polystyrene with ethylene in the presence of a compound of a transition metal of Groups V-VIII in the periodic table, e.g., titanium tetrachloride. This technique is also applicable to the alpha-olefins, such as propylene. The resulting copolymer is still a living polymer and can be terminated by the methods in accordance to the practice of the present invention.

The above-described living polymers are susceptible to further reactions including further polymerization. For example, different anionically polymerizable monomers than the original anionically polymerizable monomer may be added to the living polymers to form diblock macromolecular monomers.

These diblock macromolecular monomers are still living polymers. Thus, they are susceptible to further functionalization as hereinabove defined and thereafter can be terminated with terminating agents as described in more detail below.

The diblock living polymers can be prepared by contacting the first living polymer e.g., a living polymer of a mono-alkenyl substituted aromatic hydrocarbon such as living polystyrene or living poly(alpha-methylstyrene), with another anionically polymerizable monomer, e.g., a conjugated diene such as butadiene or isoprene. In this manner, a living diblock polymer is obtained which can be functionalized by the methods in accordance with the practice of the present invention. Utilizing this technique, a living diblock polymer of the following formula can be obtained:

A-Bθ wherein A is a polymeric block of a mono-alkenyl substituted aromatic hydrocarbon B is a polymeric block of a conjugated diene, and θ is the alkali metal ion, e.g., lithium (Li). The preparation of living polymers having a diblock structure are disclosed in U.S. Pat. No. 3,842,146, the disclosure of which is incorporated herein by reference.

Preferred polymers suitable for grafting onto other polymeric backbone chains for the purpose of preparing graft polymers effective as compatibilizers for polymeric blends that include polystyrene, are living polymers of polystyrene. Thus polystyrene is a useful polymer formed by anionic polymerization that can be effectively used to illustrate this invention. Prepared by known methods, the living polystyrene is subsequently end-capped with $CO_2$ by any suitable method and then caused to undergo an ion-exchange reaction in accordance with this invention to make it suitable for subsequent graft reactions.

The carbonation reaction is typically accomplished by contacting the living polymer with $CO_2$ under conditions sufficient to achieve polymers having terminal carboxylic acid functionality. Such conditions typically involve the introduction of gaseous $CO_2$ into the reaction mixture containing the inert solvent, the living polymer chains and a polar diluent at temperatures below about 20° C. By "polar diluent" it is meant those chemical substances of high dielectric constant within which the steric hindering compounds are soluble, and which are also either solvents for the living polymers or are substantially miscible with solvents for the living polymers. Examples of such polar diluents include tetrahydrofuran (THF), N, N, N',N'-tetraemethylethylenediamine (TMEDA), anisole, dipiperidinoethane, etc., with THF being most preferred. Suitable solvents include any of the solvents known in the prior art to be effective for use during preparation of the living polymers. These include hydrocarbons such as paraffins, cycloparaffins, aromatics and alkyl-substituted aromatics containing from 4 to 10 carbon atoms per molecule. Suitable solvents include, for example, benzene, toluene, cyclohexane, methylcyclohexane, n-butane, n-hexane and n-heptane.

The use of the polar diluent is particularly important to achieve improved reaction efficiencies. Both time of reaction for the addition of the steric hindering compound as well as the carbonation efficiency for the sterically hindered reaction product thereof are improved. The polar diluent is used in amounts of from about 2 to 25 wt.% of the total solvent, that is inert plus polar diluents, more preferably 3-20 wt.%, and most preferably 5-10 wt.%.

The operating temperature of below about 20° C. is important to achieving effective yields of the preferred carbonated polymer. The lower temperature limit will depend upon the depressed freezing point of the reaction solvent mix. The reaction pressure for this reaction is not critical, thus it can be suitably conducted at atmospheric pressure, as well as above or below.

Thus where the preferred solvents, as for polystyrene, include cyclohexane or benzene, carbonation reaction temperatures between about 0° C. and 18° C. will be most suitable. Where solvents are linear aliphatics such as hexane or heptane or substituted-benzene aromatics, such as toluene, etc., for such compounds as polyisoprene, carbonation temperatures between as low as about -50° C to about 18° C. will be most suitable. Where the inert diluent is one selected in accordance with knowledge in the art as appropriate for living copolymer and block polymers, the carbonation reaction temperature will typically be within the range inclusive of −50° C. to 18° C. It is important not to exceed about 20° C., preferably about 18° C., for the carbonation reaction so as to avoid broadening of the molecular weight distribution beyond about 2.0 for the polymer product. This broadening is indicative of the competing coupling of polymer chains that can be substantially avoided by the practice of this invention.

It is also important for the effective utilization of this invention that all reagents, solvents, diluents, etc., are substantially free of such contaminants as elemental oxygen and water. These contaminants react competitively to the $CO_2$ with the alkali metal of the polymeric anion and accordingly reduce the efficiency of the carbonation reaction. For the same reason the carbonation reaction should be conducted in an inert atmosphere.

By performing the carbonation reaction as exemplified above the polymeric alkali metal carboxylates are achieved in essentially quantitative amounts.

The ion-exchange reaction of the invention is an equilibrium reaction that is preferably driven to completion by assuring that either one of the products precipitates from the reaction mixture or alternatively that one of the products is thermodynamically preferred. The prediction of the direction of this equilibrium ion-exchange reaction can best be made by invoking the concept of Hard and Soft Acids and Bases (HSAB) as described in R.G. Pearson Ed.; *Hard and Soft Acids and Bases:* Dowden, Hutchinson, and Ross, Inc.; Stroudsburg, Penn.; 1973. In this concept Lewis acids and bases are classified as hard, soft and borderline acids and bases upon qualitative estimates of both electronegativity and polarizability. Once classified a simple rule applies: hard acids prefer to bond to hard bases, and soft acids prefer to bond to soft bases (the HSAB principle). This does not imply anything about acid or base strength but merely states that the Acid-Base complex will have added stability if both the Acid and Base are hard or if both are soft.

Lithium alkyl compounds are typical examples of alkali metal anionic polymerization initiators. The lithium cation is a extremely hard acid; it is a small acceptor atom with a high average positive charge and no unshaired pairs in its valence shells. Lithium cations have low polarizability and high electronegativity. The carboxylate anion in turn can be viewed as a hard base in that it has high electronegativity and low polarizability and is not oxidizable. In this situation the lithium carboxylate is a extremely hard acid—hard base complex and relatively unreactive. As a result, we can expect this complex to be broken only when the hard base is replaced by an extremely hard base. The ideal hard base for lithium is the fluoride anion. Thus if the polymeric lithium carboxylate is reacted with a soft acid—hard base salt like tetrabutylammonium fluoride, the exchange takes place quantitatively to give the polymeric tetrabutylammonium carboxylate and a precipitate of lithium fluoride.

In order to achieve the above described equilibrium ion-exchange reaction prior to the formation of the polymeric carboxylic acid, the soft acid—hard base salts are contacted directly with the polymeric alkali metal carboxylate within the inert solvent/polar diluent reaction mixture from the carbonation reaction, prior to acidification. Acidification and neutralization are thus unnecessary to achieve the activated polymers of this invention. Preferably then, the soft acid—hard base salt should be soluble in the reaction solvent/diluent mixture, and thus is characterized as being a hydrocarbon-soluble salt.

The exchange reaction is thus accomplished by contacting the polymeric alkali metal carboxylate with a salt composed of a "soft cation" and a "hard anion" which exhibits a high degree of solubility in hydrocarbon. Useful soft cations include tetrasubstituted alkyl, aryl and mixed aryl-alkyl ammonium and phosphonium salts as well as Crown ether (cyclic ether) and Cryptand (nitrogen-containing cyclic ether) complexes of sodium, potassium and cesium. Substitution may include $C_3$–$C_{20}$ hydrocarbon substituents, so long as sufficient substitution is present to render the salt hydrocarbon soluble, that is soluble in the typical inert solvents used for anionic polymerization. Solubility can be empirically determined but can be typically expected to be present with substituents as described. Useful hard anions include hydroxide, hydride and chloride; the most useful being fluoride. Typically, the polymeric alkali metal carboxylate is treated with a slight excess of its equivalent of the hydrocarbon soluble salt, e.g., tetrabutylammonium fluoride. The exchange reaction occurs rapidly and, in the case of polymeric lithium carboxylate, the lithium fluoride precipitates leaving a solution of the polymeric tetrabutylammonium carboxylate. The invention is thus practiced by contacting the previously prepared polymeric alkali metal carboxylate with a hydrocarbon soluble salt comprising an anion and cation pair capable of abstracting the alkali metal from said polymeric alkali metal and substituting therefor the anion of the hydrocarbon soluble salt.

Neither temperature nor pressure are critical to the practice of the ion-exchange reaction of the invention except to the extent that the equilibrium reaction may be driven in the preferred ion-exchange direction. Thus typically the temperature of the reaction mix will initially be at or near the temperature at the completion of carbonation, or up to about room temperature. The ion-exchange reaction is exothermic and will occur rapidly upon mixing.

The preparation of functionalized polymers in accordance with this invention are illustrated and distinguished by the following examples. These examples are intended only to illustrate the invention and not in any sense to limit the manner in which the invention can be practiced.

General Comments:

All reactions and reagents were handled under a inert atmosphere of nitrogen with careful exclusion of both oxygen and water. The monomers were purified by distillation within a day of polymerization from dibutylmagnesium. The solvent (heptane, cyclohexane, or tetrahydrofurane) was purified the day of the polymerization by distillation under nitrogen of 25 percent of the total volume or alternatively by vacuum distillation from butyllithium. The monomer was added to the solvent just prior to use. Tetramethylethylenediamine ("TMEDA") was purified by passage through molecular sieves. The purified TMEDA was stored in cyclohexane or tetrahydrofuran solution to which a small amount of 1,1-diphenylethylene and butyllithium was added (Butyllithium was added to the solution until the characteristic red color is formed; the deep red color is a good indicator of the purity of the solution). All glassware, syringes and needles were oven dried at 150° C. for three hours. The hot glassware was cooled and assembled under inert atmosphere usually in a dry box.

EXAMPLE 1

Carbonation of Poly(styryl)lithium in Cyclohexane Using TMEDA and Carbon Dioxide.

A three liter round bottom flask was fitted with a reflux-takeoff head and an adapter containing a stopcock and serum stopper. The flask was charged with 2.75 liters of cyclohexane. The cyclohexane was distilled until 2 liters remained, then the flask was allowed to cool to 40° C. before styrene (104 g, 200 ml) was added. The flask was placed in a hexane bath to aid in the regulation of the temperature. The polymerization was initiated by adding 18.9 ml s-butyllithium (1 M in hexane). The temperature of the bath rose to 50° C. and the viscosity increased rapidly. After four hours, a solution of TMEDA in cyclohexane was added (25 ml of 0.25 g/ml solution). The flask was then cooled to $-10°$ and reagent grade carbon dioxide was bubbled into the flask. The color discharged instantaneously with mixing. The resulting polymer was split into two portions for examples 2 and 3. A small aliquot was analyzed by GPC ($M_w=5834$, $M_w/M_n=1.06$); this sample was free of high molecular weight modes which are indicia of a lack of coupling side-reactions and a resulting high percentage of poly (styryl)lithium carboxylate.

EXAMPLE 2

Direct Ion-exchange with Tetrabutylammonium Fluoride and Graft Reaction.

Polystyrene lithium carboxylate (50 g), prepared as in example 1, was reacted with tetrabutylammonium fluoride (15 ml, 1 g in THF). The resulting solution was added to a solution of poly(isobutylene-co-4-bromomethylstyrene) (150 g in 1.5 L cyclohexane). This copolymer can be produced in a manner such as that set forth in U.S. patent application Ser. No. 07/199,665, filed on May 27, 1988. The mixture was stirred and heated slowly to 70° C., at which time it was reacted for two hours. After two hours, the polymer was isolated by coagulation in isopropanol (0.1 g BHT). The resulting graft copolymer was transparent and tough; GPC (Gel Permeation Chromatography) indicated that more than 90 percent of the polystyrene was grafted.

COMPARISON EXAMPLE 3

Ion-exchange Through Acidification-Neutralization and Graft Reaction.

The polystyrene lithium carboxylate prepared as in example 1 was placed in a five liter jacketed flask and treated successively with: (1) 1200 ml HCl/IPA/H$_2$O (10% conc. HCl, 10% IPA, 80% H$_2$O); (2) three times with 1000 ml solution of 90% H$_2$O/10% isopropanol; (3) addition of 1 liter cyclohexane, and distillation off of the added cyclohexane. The resulting dry polymer solution was then treated with 15 ml tetrabutylammonium hydroxide (1 M) and 7 g BHT. A solution containing poly(isobutylene-co-4-bromo methylstyrene) (150 g in 2 liters cyclohexane) was added and the flask was slowly heated to 70° C. After a two hour reaction period, the polymer was isolated by coagulation in isopropanol (0.1% BHT). The resulting polymer was opaque and relatively weak; GPC analysis indicated that 30 percent ungrafted polystyrene remained in the polymer.

What is claimed is:

1. A method for preparing functionalized polymers of monomers capable of anionic polymerization comprising contacting a polymeric alkali metal carboxylate, formed by anionic polymerization and subsequent reaction with gaseous CO$_2$, with a hydrocarbon soluble salt capable of abstracting the alkali metal from said polymeric alkali metal carboxylate and substituting therefore the cation of said hydrocarbon soluble salt, essentially without formation of a polymeric carboxylic acid.

2. The method according to claim 1, wherein said hydrocarbon soluble salt consists of at least one member selected from the group consisting of tetra-substituted alkyl, aryl, and aryl-alkyl amonium and phosphonium salts, wherein the substitution comprises C$_3$–C$_{20}$ hydrocarbon substituents.

3. The method according to claim 1, wherein said hydrocarbon soluble salt consists of at least one member selected from the group consisting of Crown ether and Cryptand complexes of sodium, potassium and cesium.

4. The method according to claim 1, wherein said monomers capable of anionic polymerization comprise at least one monomer selected from the group consisting of styrene, isoprene and butadiene.

5. The method of claim 1, wherein said reaction with gaseous $CO_2$ is conducted in a reaction solvent containing 2–25 weight percent of the total solvent of a polar diluent.

6. The method according to claim 1, wherein the reaction with gaseous $CO_2$ is performed at a temperature less than 20° C.

7. The method according to claim 6 wherein the temperature range is between −50° C. and 18° C.

8. A method for preparing functionalized polymers comprised of monomers selected from styrene, isoprene and butadiene comprising contacting the alkali metal carboxylate of said polymer with a hydrocarbon soluble salt capable of abstracting the alkali metal from said polymeric alkali metal carboxylate and substituting therefore the cation of said hydrocarbon soluble salt, essentially without formation of a polymeric carboxylic acid.

9. The method according to claim 8, wherein said hydrocarbon soluble salt consists of at least one member selected from the group consisting of tetra - substituted alkyl, aryl, and aryl-alkyl amonium and phosphonium salts, wherein the substitution comprises $C_3$–$C_{20}$ hydrocarbon substituents.

10. The method according to claim 8, wherein said hydrocarbon soluble salt consists of at least one member selected from the group consisting of Crown ether and Cryptand complexes of sodium, potassium and cesium.

11. The method of claim 8 wherein said alkali metal carboxylate is polystyrene lithium carboxylate.

12. A method for preparing functionalized polystyrene comprising the steps of:

(A) Conducting anionic polymerization of styrene utilizing sec-butyllithium in an inert organic diluent;

(B) Contacting the polymer formed in step A with gaseous $CO_2$ in the presence of tetrahydrofuran or N,N,N',N'-tetramethylethylenediamine at a temperature of 0–18° C. so as to form polystyrene lithium carboxylate; and (C) Adding to the reaction mixture of step B tetrabutylammonium fluoride in an amount that is at least the molar equivalent to that of the sec-butyllithium of step A.

* * * * *